Figure 1:
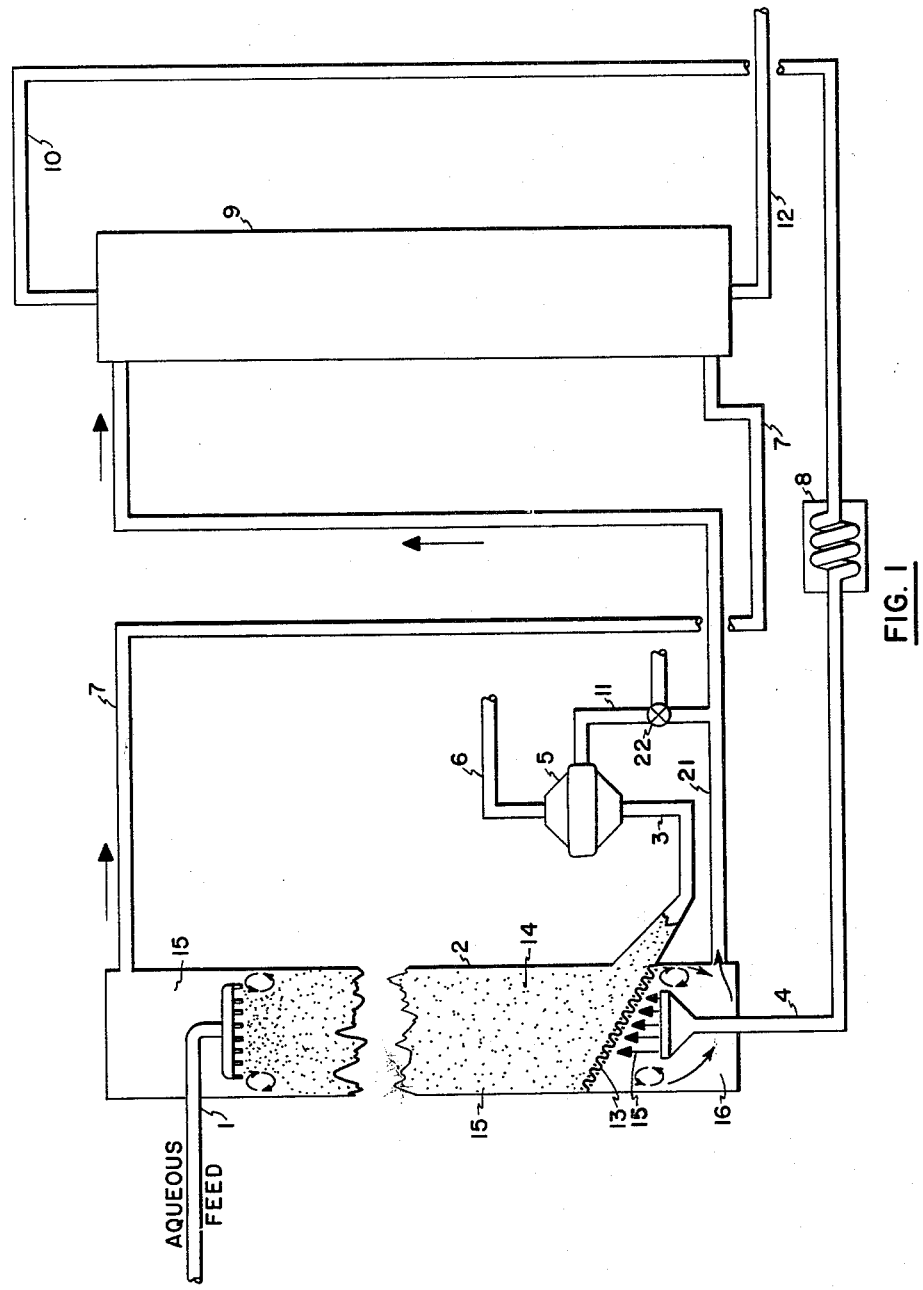

Leonard B. Torobin
Donald L. Baeder   Inventors

By Perry Carvellas

Patent Attorney

April 27, 1965 L. B. TOROBIN ETAL 3,180,102
METHOD OF FRACTIONALLY CRYSTALLIZING SOLUTIONS
WITH AN IMMISCIBLE LIQUID COOLANT
Filed Dec. 29, 1961 3 Sheets-Sheet 3

Leonard B. Torobin
Donald L. Baeder

Inventors

By Perry Carvellas

Patent Attorney 3,180,102
METHOD OF FRACTIONALLY CRYSTALLIZING SOLUTIONS WITH AN IMMISCIBLE LIQUID COOLANT
Leonard B. Torobin, Newark, and Donald L. Baeder, Berkeley Heights, N.J., assignors to Esso Research and Engineering Company, a corporation of Delaware
Filed Dec. 29, 1961, Ser. No. 163,215
12 Claims. (Cl. 62—58)

This application is a continuation-in-part of application Serial No. 135,092, filed August 1, 1961.

This invention relates to a process of removing the water from aqueous solutions comprising cooling the solution to form ice crystals and separating the crystals.

This invention further relates to a process of separating water from an aqueous solution in which the water is soluble at certain temperatures and insoluble at lower temperatures in which the water is crystallized from its solution by countercurrently contacting it with a liquid immiscible coolant of different density than the aqueous solution containing the water to be separated, wherein the aqueous solution is introduced in the form of a dense dispersion of uniform size droplets and the coolant as a continuous phase. Further, the invention relates to a novel process of obtaining controlled rates of heat transfer between an aqueous solution and an immiscible liquid coolant of different density wherein ice crystals are grown in the aqueous solution, which comprises countercurrently contacting the liquids by introducing the aqueous solution into the top or bottom of the column in the form of a bed of a dense dispersion of uniform size droplets and introducing the coolant liquid into the other end of the column as a continuous phase.

Specifically, this invention relates to a method of obtaining substantially pure water from aqueous solutions containing suspended and/or dissolved solids. Further, this invention relates to a method of concentrating aqueous solutions by removal of all or part of the water present in the form of ice crystals.

Various methods have been used in an attempt to find a practical way of crystallizing water from aqueous solutions. In contacting immiscible coolants with aqueous feeds, frequently an emulsion results which is very difficult to separate. Whenever two-phase mixing or the spraying of one-phase into the other by conventional methods is employed, a wide Gaussian droplet sized distribution normally occurs. The extremely small drops of this distribution will have a very slow rise velocity. Some will be sufficiently small so that they will be permanently dispersed due to Brownian motion. This would result in permanent contamination of the decrystallized product or feed or coolant.

A further disadvantage of the methods previously employed in direct cooling was the difficulty of obtaining uniform, controlled slow chilling rates which are required for proper crystal growth. Although the average chilling rate for proper crystal growth may be 1 to 2° F. minute for certain materials, local chilling rates far in excess of these values may occur due to the relatively small areas available for heat transfer in indirect equipment and the large mixing lengths which characterize direct type equipment. These local chilling rates give rise to the formation of small crystals which exert a disproportionately large adverse effect on the separation.

In indirect heat transfer apparatus, for example, shell and tube heat exchange equipment, an additional disadvantage is the relatively large temperature difference between the cooling surface and the feed being chilled. Reduction of this temperature difference is highly desirable for two reasons. In the first place, crystal growth is improved as the temperature difference is reduced and, secondly, the overall cost of the chilling process is reduced as the temperature difference is minimized, since it reduces the refrigeration requirement and allows a more efficient recovery of refrigeration. For a given rate of heat transfer, the temperature approach can, of course, be reduced by increasing the area for heat transfer. Indirect heat exchangers are generally limited in this respect because of mechanical limitations and the problem becomes particularly acute because restricted internals would readily become blocked with crystal formations.

Previous attempts to separate crystallized materials from their solutions have in many instances been unsuccessful due to the uneven and small crystal size developed in conventional heat exchange or cooling apparatus. Centrifuges did not separate these crystals efficiently due to their slow settling velocities in the mother liquor.

As previously stated, when spraying one immiscible liquid into another, a wide sized distribution of droplets will normally result. The different sized droplets will rise or descend in the coolant at different velocities, some being shocked chilled and others being suspended in the tower or made to flow concurrently with the coolant. This wide size distribution occurs at the higher spray throughput velocities needed to obtain the dense bed and is aggravated by a continuous phase vortex which is formed at the periphery of the spray head and which constitutes a major disturbance across the spray head surface.

Previous attempts to crystallize water from aqueous solutions have utilized indirect heat exchange apparatus wherein the water as it crystallized from solution coated the cold heat exchange surface from which it periodically had to be removed. Other processes using direct cooling have utilized a cooling chamber wherein volatile solvents, such as propane and/or butane, were mixed with the aqueous solution and the entire mixture was cooled by evaporation of the solvent. Both of these processes can cause shock chilling; that is, rapid formation of the ice crystals, which crystals occlude the dissolved solids in the aqueous solution. Further, any system which utilizes autorefrigeration solvents may experience severe turbulence in the vicinity of the growing crystals and prevent the formation of large crystals, also the local expansion of the solvent in vaporizing may disintegrate crystals already formed.

The most common commercial process for concentrating or removing water from aqueous solutions is by heating and evaporating the water present. While this procedure has been successful to some extent in effecting dehydrating of aqueous solutions, it has often resulted in undesirable chemical changes in the dissolved solids in the solution which may be sensitive to high temperatures.

An object of this invention is to provide a system with a very large interfacial area for controlled heat transfer between a feed to be treated and a coolant in order to obtain a minimum temperature approach between the coolant and the feed stream being processed. Another object of this invention is to make direct contact, immiscible cooling for separation by crystallization feasible by avoiding the need for internals which clog with crystallized material and the need for scrape surface chillers. A further object of this invention is to provide an economical, commercially feasible, continuous crystallization process which requires substantially less initial investment in equipment, little or no maintenance cost, and minimum operating expense. Another object of this invention is to solve the problem of emulsion difficulties which arises in any system using an intimate mixture of immiscible liquids.

It is a further object of this invention to provide an efficient method for removing water in the form of ice crystals from an aqueous solution wherein there is substantially no or a minimum contamination of the ice crystals with the dissolved solids in the solution and where there is a minimum loss of dissolved solids by occulsion in the separated ice crystals. It is a further object of this invention to provide an efficient, economical method of obtaining potable water. A still further object of this invention is to provide a method of concentrating aqueous solutions by the removal of all or part of the water present. It is a further object of this invention to obtain potable water for drinking and irrigation purposes from sea water. It is a still further object of this invention to provide a process for dehydrating beverages in which water is removed from the beverage in the form of ice crystals and in such a manner that there is very little carryout of the solution being concentrated with the ice.

These and other objects and advantages will become more apparent in view of the following description of the invention.

Now, in accordance with this invention, an aqueous solution containing crystallizable water is fed to a treating column which has no internals, at a temperature above the freezing point of the water solution, which enters the top or bottom of the treating column in the form of a dense dispersion. This dense dispersion is produced by a modified spray head described in copending U.S. S.N. 135,092 filed August 1, 1961, and is made up of very closely packed uniform diameter droplets which rise or descend in the column as a bed of spheres, depending on the density of the coolant and at which end of the column it is fed. A continuous liquid coolant phase is fed at the opposite end of the column as the feed, and moves countercurrently to the dense bed of spheres. Because of the uniformity of size of the droplets making up the dense bed of spheres, the droplets move uniformly as a bed in the column and because of the uniformity of the size of the droplets have about the same volume density throughout the column and are chilled at a controlled rate. Within the dense bed the individual droplets exhibit a localized random motion which enhances heat transfer and crystal growth. The coolant is charged to the column at a temperature below the freezing point of the aqueous solution. By the time the dense bed of droplets reaches the opposite end of the column, part or substantially all of the crystallizable water in the droplets is crystallized out as ice. At the opposite end of the tower, the ice crystals and mother liquor form a slurry. This ice crystal and mother liquor slurry is withdrawn from the tower and can be either filtered or centrifuged to separate the crystals from the mother liquor. The warm coolant is withdrawn from the tower at the end opposite to which feed is withdrawn and then cooled to its inlet temperature for reuse.

This dense dispersion technique provides an extremely efficient method of heat transfer between the two immiscible liquids. By controlling the diameter of the aqueous spheres and the volume density of the dispersed phase, the rate of movement of the bed of spheres countercurrently to the coolant, the rate of cooling of the spheres in the tower, and the rate of crystallization of the water in the feed are controlled. Controlling these conditions in such a manner that the ice crystals form slowly allows sufficient time for the forming crystals to reject the dissolved solids and for relatively pure ice crystals to form. Contact of the ice crystals with the coolant after they have formed a crystal matrix at the end of the tower which materially assists in washing from the crystals any occluded dissolved solids.

In order to obtain uniform size droplets from the spray head, an annular baffle at the periphery of the spray head was constructed; i.e., at the outer edge of the orifice plate, which serves to deflect the standing continuous phase vortex away from the orifice holes at the outer edge of the orifice plate. The orifices are made to protrude to discourage the wetting of the spray head surface. In doing this, it was unexpectedly found that the critical throughput for a specific rate, above which non-uniform drops occurred, could be increased by about 80 to 100% with the annular baffle, over that without the annular baffle. It is known that at low throughput rates uniform drops can be obtained, however, at throughput rates required to form the dense bed non-uniform distribution normally occurs.

The modified spray head used to obtain uniform size droplets is more fully described in copending U.S. S.N. 135,092.

In a specific embodiment of this invention, potable water is obtained for drinking, agricultural, and other uses by crystallizing water as ice from aqueous solution containing dissolved solids. A principal application of this invention would be in removing water from sea water in the form of relatively pure ice crystals which are subsequently melted to obtain potable water. Adaptation of the dense dispersion column described herein to desalinate water overcomes most of the problems previously encountered. For example, large crystals can be obtained by maintaining a minimum temperature difference at any point in the column throughout the column between the salt water to be treated and the coolant phase. In this environment, crystals can be grown slow enough so that they grow to uniformly large size while, at the same time, allowing sufficient time during the growth and crystallization to reject any dissolved sodium chloride or other salts which are normally occluded in the ice crystal.

In another embodiment of this invention, aqueous solutions are treated to obtain more concentrated solutions by countercurrently contacting the aqueous solution with a cold immiscible coolant. In this application, the aqueous solution is sprayed into the treating column in the form of a dense dispersion of uniform size droplets which are countercurrently contacted with an immiscible coolant continuous phase. The coolant is charged to the tower as a continuous phase at a temperature below the freezing point of the water solution and crystallizes a portion of the water present in the solution which is removed as a slurry of ice crystals and mother liquor from the bottom of the column. The ice crystals can be separated from the more concentrated aqueous solution or mother liquor by using a basket centrifuge or by filtration.

This embodiment has specific applications to temperature sensitive solutions, for example, beverages, wherein the flavor or the vitamins present may be altered or detrimentally affected by heat if heat were used to concentrate the solutions by evaporation. This process can be advantageously used to preserve in the concentrated solution volatile constituents which would normally be entrained or vaporized and removed during concentration at low temperatures employing vacuum evaporation or in crystallizing by vaporizing a direct contact refrigerant. Also, economic concentration of aqueous industrial waste streams can be carried out in accordance with this process and the concentrated waste materials more easily disposed of.

These, and other objects and advantages will become apparent from the following description taken in connection with the drawings, wherein, FIG. I is a diagrammatic, elevational view of an immiscible cooling crystallizing apparatus containing two heat transfer towers; namely, a tower for crystallizing the crystallizable water in the feed and a second tower for heat exchange between the warm coolant and the cold, treated mother liquor from which the crystallized water has been separated. This diagram also shows a means of external heat exchange to provide makeup refrigeration for the immiscible coolant; and a separation apparatus for separating the crystallized material from the solute.

FIG. II is a more detailed diagrammatic, elevational view of a proposed scheme for obtaining potable water from sea water.

FIG. III is a graphic representation showing the effect of droplet concentration on the ratio of rise velocity of the dense dispersion to the rise velocity of a single drop in an infinite fluid.

The aqueous solution from which water is to be crystallized must remain liquid under the conditions of spraying. For example, the crystallizable water should be completely dissolved in the feed prior to spraying and, after crystallization, the mother liquor should remain in a fluid, easily handled state for ease in separating the crystallized material from the mother liquor. Further, in order to prevent the formation of an emulsion or entrainment in the coolant of the aqueous solution, there must be sufficient density difference between the coolant and the aqueous solution so that they naturally separate by gravity. This difference should exist even after the crystallized water is separated from the mother liquor. Any aqueous solutions containing dissolved water, which will crystallize on cooling, is a suitable feed.

A typical feed to this process would be sea water, which contains as a principal contaminant about 3.5 weight percent of sodium chloride. Other salts, in substantially smaller amounts, are present. Generally, an efficient operation for obtaining potable water from sea water would involve the removal of about 10 to 50 percent by volume of the sea water as ice crystals, which crystals are subsequently melted to form the fresh water product. More or less than 50 percent of the water can be removed, depending on the refrigeration capacity available as well as other considerations. If there is only a small amount of refrigeration capacity availaable, only 10 percent, for example, of the water need be removed, since this can be done at a much higher temperature than removal of 50 percent of the water present. The maximum amount of water that can be removed would be about 80–90 percent by volume, since at this point sodium chloride hydrates form, and undue contamination of the ice to be removed would occur. Reduction in the sodium chloride present in the removed ice crystals to 300–500 parts per million of sodium chloride results in a potable fresh water product.

Another suitable feed for this process is fresh orange juice. A typical fresh orange juice composition would contain 0.005 percent oil and a sugar to acid ratio of about 13/1. In accordance with the described process, the volume of fresh orange juice can be reduced by 75–80 percent by the removal of crystallizable water. The concentration of the orange juice slurry that results can be frozen and shipped as such, or possibly could be dried by evaporation at ambient temperature to form a completely dry concentrate.

In concentrating orange juice, it is important from the point of economy to minimize the amount of dissolved orange juice solids which are occluded in the removed ice crystals. However, the primary consideration here is in the preservation of the flavor of the product, and loss of minor amounts of occluded solids is relatively unimportant. An additional feature of primary importance is the growing of large uniform size ice crystals which can be readily separated by filtration or centrifugation or other conventional separating processes.

Still another specific feed to the described process, for purposes of concentrating the feed for ease in shipment and economies in packing, would be beer or ale. A considerable amount of interest has recently been expressed in an efficient, economic means for concentrating beer in such a manner that the flavor and quality of the beer is not affected, for subsequent shipment and reconstitution at outlying distribution points. Beer containing 3.6 weight percent alcohol can be concentrated in accordance with the above described process to remove 60–80 percent by volume of the water present in the form of ice crystals, which increases the concentration of alcohol to about 12.5 weight percent. Here, again, the chemical composition of beer which contributes to its distinct flavor and acceptability is extremely temperature sensitive and the cold concentration process prescribed would result in removal of water and concentration of the beer without a detrimental effect on the beer flavor or loss of volatile constituents.

In another specific embodiment of this invention, an industrial waste stream is concentrated to facilitate disposal and obviate normal pollution problems. For example, waste sulfite liquors are discharged from pulp mills in large quantities and contain from 10 to 15 percent dissolved solids causing objectionable contamination of rivers and streams. The sulfite waste liquor could suitably be cooled and concentrated in accordance with the above described invention to a point approaching obtaining completely dry solids. The minor amount of occluded solids present in the separated ice crystals would not normally constitute a pollution problem and the melted ice crystals could be disposed of directly in rivers or streams, or the purified water could be reused in the process. The 15 to 20 percent by volume of concentrated slurry obtained could easily be disposed of or be dried by evaporation and the dried solids disposed of in a conventional manner. This process also provides an efficient, economic method of recovering small amounts of dissolved solids in industrial process streams, and for the recovery of minerals from fresh and salt water.

The coolant should be immiscible or at most only partially miscible with the aqueous solution. Where it is undesirable to have the coolant contaminate the decrystallized feed, the coolant should be substantially immiscible with the feed. The only other requirements for the coolant are that it be of a different density than the feed and that it be liquid at the temperature to which the feed is to be cooled.

The suitable coolants for crystallizing water from an aqueous solution are oil fractions, pure chemicals, liquid metals, and the like. However, certain coolants may be selected to simultaneously effect chemical reactions or extractions. In desalinating water, suitable coolants are oil fractions, edible vegetable oils, cottonseed oil, normally gaseous liquid hydrocarbons, halogenated hydrocarbons, Freons, etc.

The coolant can be either less dense or more dense than a specific aqueous solution being treated. If a coolant is more dense than the feed used, it will be fed to a treating column through the top of the column and the feed to be treated in the bottom of the column in a manner described in copending application S.N. 135,092. On the other hand, if the coolant to be used is less dense than the feed being treated, the coolant will be fed to the treating column in the bottom of the column and the feed will be fed to the top of the column in the manner more specifically described in the present application.

Various diluents may be added to the coolant which is to be used to crystallize the feed in order to improve the viscosity of the coolant so that it may be more easily handled and/or to aid in the crystallization and separation of the crystals from the feed. Solvents for the coolant may be added, as well as antisolvents for the water being crystallized. Depending on the feed being treated, solvents for the coolant, such as aromatic hydrocarbons, aliphatic hydrocarbons, and the like, may be used.

By carefully controlling the droplet size diameter in the range of 3/8 to 1/24 inch, preferably in the range of 1/4 to 1/20 inch, though diameters of the size of 1/2 to 1/32 inch may be used, I have been able to control the volume density of the dense dispersion of droplets and thereby control the velocity of movement and rate of cooling of the feed. The droplet diameter is generally about twice the diameter of the orifice through which it has been sprayed.

For the sake of simplicity, the aqueous feed will hereinafter be referred to as descending in the column and the coolant as rising. It is important that uniform spherical shaped droplets of narrow size distribution be obtained. If non-uniform diameter droplets are formed, as usually occurs in conventional spray columns, the individual droplets will rise at different rates and controlled chilling of the feed cannot be obtained. This will result in a wide particle size distribution of the crystals formed and the smallest particles will either cause blinding in the filter medium or will not centrifuge at reasonable throughputs and gravitational fields. Also, an undue amount of contamination of the crystals with mother liquor can occur.

The dense dispersion of uniform diameter droplets provides maximum surface for heat transfer and results in maximum efficiency of heat transfer from the aqueous solution droplets to the coolant and subsequently from the warmed coolant to the cold decrystallized mother liquor. By controlling the rate that a feed is charged to the treating tower, the droplet diameters and the rate of descent of the dense dispersion of the bed of spheres, it is possible to prevent shock chilling below the crystallization temperature and to form crystals which are substantially pure and which can be subsequently easily separated from the mother liquor. Because of this efficient means of heat transfer, the temperature difference between the two phases at any point in the column is minimized and therefore the growth of large pure crystals is enhanced. All of these advantages have been obtained without the droplets in the dense dispersion forming agglomerates. Although the droplets are very closely packed, they do not agglomerate as long as there is movement of the continuous coolant phase through the liquid bed of droplets.

The aqueous solution to be crystallized can be charged to the treating tower at a rate of 15 to 325 ft.$^3$ per ft.$^2$ of column cross section per hour though rates of 35 to 150 ft.$^3$/ft.$^2$/hr. are preferred; however, rates of 25 to 250 ft.$^3$/ft.$^2$/hr. can also be used. The rate at which the aqueous solution is charged to the treating tower will depend on the feed temperature, the final crystallization temperature and the height of the column. The rate at which the aqueous solution is charged to the treating tower and countercurrently contacted with the immiscible coolant is sufficient to provide the desired dense dispersion of droplets which descend in the column at the desired velocity to provide the necessary rate of heat transfer, obtain proper chilling and crystallization in the droplets.

The difference in density between the two immiscible liquids being contacted is sufficient to separate the liquids by gravitational force under the conditions in which the process is carried out. The rate of descent of the feed in the column is a function of the volume density of the dense dispersion and the feed rate. All of these variables have a direct effect on the cooling rate of the material being treated which is, of course, critical. Cooling rates of .25 to 15° F. per minute can be used; more preferably, rates of ½ to 7° F./minute are used, but depending on the materials being treated, the chilling rate can be 1–3° F./minute. One of the most important variables affecting the rate of ascent or descent of the material being treated in the treating column is the droplet holdup or, otherwise stated, the volume density of the droplets as compared to the total volume of the droplets and immiscible coolant phase. Another is the droplet diameter, which has been previously discussed.

The volume holdup can be .35 to .80 ft.$^3$ feed/ft.$^3$ column, preferably a holdup of .55 to .75 ft.$^3$ feed/ft.$^3$ col. is used. The residence time of the droplet in the tower is determined, to a certain extent, by the desired chill rate and the chilling range. The rate and temperature at which the immiscible coolant is charged to the treating tower and contacted countercurrently with the dense dispersion of uniform diameter droplets affects the amount of cooling of the feed that is obtained. Throughput rates of coolant are comparable to the throughput rates of feed and will vary slightly with their relative specific heats and their respective densities.

The input temperature of the coolant to the treating tower is sufficient to chill the droplets to the separation temperature and to crystallize or precipitate the desired amount of crystallizable water from the aqueous feed. The inlet temperature of the coolant will be 1 to 10° below the outlet temperature of the feed and at least 1 to 10° below the minimum crystallization temperature of the crystallizable material.

The inlet temperature of the aqueous solution being treated can be advantageously just above the temperature at which ice begins to crystallize at the concentration of dissolved solids present in the aqueous solution being treated. Solutions to be treated can be received at substantially higher temperatures and rapidly chilled to a temperature just above the crystallization temperature of the solution efficiently and economically by using a tower as described in this invention as a heat exchange tower, only. Alternatively, the rapid chilling to a temperature just above the crystals temperature can be accomplished in any conventional heat exchange apparatus. In this manner, the entire capacity of a particular heat exchange tower can be used to grow high purity crystals with a minimum amount of the capacity being used to reduce feed to its initial crystallization temperature.

The crystalization temperature for any specific feed will obviously depend upon the amount of dissolved solids present. Suitable initial inlet temperatures for an aqueous feed can be 20 to 200° F. More commonly, inlet temperatures will be in the range of 25 to 70° F. The inlet temperature of the coolant will be determined by the acceptable chilling rate for a specific feed, the degree of purity of the desired ice crystals that are formed, and the amount of water it is desired to remove as ice crystals. Suitable inlet temperatures of coolant will be 30° F. to —100° F. More commonly, in removing ice from aqueous solutions, temperatures will be in the range of 20° F. to —30° F. Carrying out the process in this manner can effectively remove from 5 to 80 percent by volume of the solution present as relatively pure, up to substantially pure ice crystals to obtain the desired concentration and/or purity of water product.

A specific desirable feature of the described cooling process is that the rate of growing the ice crystals can be controlled in such a manner that there is sufficient time allowed for the ice crystals to reject impurities as they are grown. The contact of the crystal matrix that accumulates in the bottom region of the tower with the coolant advantageously affects the removal of any occluded impurities from the surface of the crystals.

The separation process can be advantageously carried out at approximately atmospheric pressure. However, this may change depending on whether or not a solvent is used to aid in reducing the viscosity of the coolant or in the crystallization of the solution being treated. Since it is desirable to maintain all of the reactants in the liquid phase when volatile solvents are used, sufficient pressure is employed to maintain these solvents in the liquid phase.

A uniform crystal growth is obtained from various aqueous feeds by carefully controlling the rate of cooling. Crystals of size 25 to 1000 microns, depending on the feeds and the conditions of crystallization can be grown. However, crystals of size 50 to 400 microns are more common. A uniform crystal growth under the control conditions of the inventive process has facilitated the separation of crystallizable water from various solutions in relatively to substantially pure form and with minimum loss of dissolved solids. These separations have heretofore not been either efficient or economically feasible by direct immiscible coolant techniques known in the art.

The equipment used to carry out the invention is relatively simple and comprises two or more heat exchange towers without internal baffling, means for transferring the feed and coolant between the towers and a means for adding makeup refrigeration. As previously stated, an appropriate separation means is used for separating the crystallized material from the mother liquor; for example—a filter, basket centrifuge, or suitable screw pump extrusion device. In removing water from an aqueous solution, a single large tower or a bundle of smaller diameter units operating in parallel or series can be used. The second tower for heat exchanging the warm coolant with the cold mother liquor is of similar dimensions, or can be suitable groupings of smaller diameter columns arranged in bundles. The height and diameter of apparatus for a specific process can be varied to accommodate the required cooling and throughput for a specific feed. The crystallization towers can also be operated in series wherein the inlet temperatures of the feed and coolant can be reduced in successive towers.

The spray head used for introducing the uniform diameter droplets is important in this invention in that it allows greater throughput of uniform diameter droplets without upsetting the column. This spray head produces the uniform diameter droplets which pack and rise as a bed, each droplet rising at the same velocity as the next droplet, providing a column of droplets of about equal volume density throughout the tower. Generating the droplets in this manner provides the same environment and cooling history for each droplet in the densely packed beds, resulting in obtaining large ice crystals.

The invention, however, is not to be limited to this manner of forming the uniform diameter droplets, since any means by which the uniform diameter droplets are formed can be used in accordance with this invention and are intended to be encompassed.

In accordance with one embodiment of the invention, wherein it is desirable to obtain a preliminary separation of the ice crystals from the mother liquor, a slanting grid or drainboard or screening means, is provided in the bottom of the contacting tower (where the feed to be treated is fed to the top of the tower) which diverts the ice crystals and removes them from the side of the tower. The screening means can be either above or below the coolant inlet means. The major portion of the mother liquor continues down in the tower around the coolant sprayhead and is removed from the bottom of the tower as the primary mother liquor. By having the screening means above the coolant inlet, the coolant liquid washes the ice matrix accumulated on the screen and replaces some of the occluded mother liquor located in the interstices of the ice matrix with coolant liquid. A minor portion of the mother liquor continues with the diverted ice crystals and is separated from the ice crystals in a conventional separation apparatus, this mother liquor being referred to as the secondary mother liquor. This particular feature of the invention is not essential in carrying out the crystallization step described and merely forms a specific embodiment of the invention. Providing preliminary separation of the ice crystals from mother liquor reduces the amount of separation capacity required to remove the ice crystals from the mother liquor.

The treating tower can either have the solution to be treated fed into the top and the coolant fed into the bottom or, conversely, the coolant fed into the top and the solution to be treated fed into the bottom. Whichever configuration is adopted, the solution to be treated is the one that is fed in the form of a dense dispersion of uniform diameter droplets.

In one embodiment of the invention, a tower may be used primarily to form crystals of the water to be separated, and additional units may be used primarily to wash the crystals to remove the remaining amount of occluded dissolved solids present. Such units could incorporate washing the crystals with mother liquor, coolant, or with a small amount of warm pure water product.

The novel features of this invention may perhaps be better understood by referring to the accompanying drawings.

FIGURE I of the drawings describes an embodiment of the immiscible coolant crystallization, separation and concentration process. An aqueous solution containing crystallizable water is fed to treating column 2 through line 1 and feed at a temperature sufficiently high to render all of the crystallizable water in the feed in solution and to render the feed sufficiently fluid that it may be conveniently handled. The feed is introduced in the column in the form of a dense dispersion of uniform diameter droplets 14 of a size such that there is a maximum area for heat exchange between the sprayed droplets and the immiscible coolant liquid 15 consistent with the optimum desired descent velocity. The aqueous solution, from which the water is to be crystallized, is fed at a rate which attains the desired volume density of sprayed droplets in the continuous phase. The feed rate is dependent upon, to a certain extent, the density difference between the aqueous solution and the coolant, as well as upon the rate at which the coolant 15 is charged to column 2. The volume density of the droplets in the continuous phase, i.e., the holdup, is sufficient to obtain the desired rate of descent in the column and, accordingly, the desired cooling rate. The dense dispersion of sprayed droplets descend in column 2 countercurrently to an ascending continuous phase of coolant at a rate regulated in such manner that there is sufficient heat transfer from it to the coolant to crystallize out of solution the required amount of crystallizable material present in the feed. The immiscible coolant 15 is introduced through line 4 at a temperature selected to crystallize from the feed all or part of the crystallizable water present in the feed.

The coolant is fed at such a rate that will not upset the countercurrent flow of the sprayed aqueous droplets. By controlling the rate of feed and coolant to column 2, the rate of descent of the sprayed droplets in the tower is regulated so that there is sufficient heat transferred from the coolant to the feed in the column to crystallize the water present in the feed. By carefully controlling the droplet size and its holdup in the heat exchange column, and the temperature of the coolant and rate of the feed of the coolant, the rate of cooling of the droplet is controlled so that large, relatively pure, easily separated ice crystals of water are grown. Controlled crystal growth allows time for the ice crystals to reject impurities as the crystal increases in size. This results in obtaining relatively to substantially pure ice crystals.

Also, the countercurrent flow of the coolant effectively aids in washing away occluded impurities from the surface of the ice crystals which have collected in the bottom region of the tower. In order to maintain effective countercurrency in the column, and washing of the ice crystals by coolant, the difference in density of the two materials to be countercurrently contacted is such that they easily separate by gravitational force under the desired operating conditions so that the liquid fed into the bottom of the column is withdrawn at the top and liquid fed to the top of the column is withdrawn from the bottom of the column.

The sprayed dense disperision of droplets are allowed to stay in contact with the coolant for a sufficient time to form large, relatively pure, easily separated ice crystals and to crystallize all or part of the crystallizable water present.

The crystallized water and the mother liquor form a slurry which is removed from the bottom of the column 2. A preliminary separation can be accomplished by collecting the ice crystals on a wire grid 13 and allowing most of the mother liquor (primary) to continue downward. Alternatively, the entire slurry can be removed and separated in a conventional manner. The ice crystal slurry is fed through line 3 to an appropriate separation apparatus 5.

The pressure under which the countercurrent contact takes place is such that all of the materials remain in the liquid phase. Separation means 5 removes the crystallized material from the remaining chilled secondary mother liquor, which liquid is taken through line 11 via valve 22 and added to primary mother liquor in line 21 and fed to another heat exchange column 9 wherein the total chilled decrystallized mother liquor is countercurrently contacted with the warm coolant removed from the top of column 2 via line 7 and fed to column 9. The warm coolant and cold mother liquor are countercurrently contacted in similar manner as the dense dispersion technique used in column 2 in order to recover refrigeration.

Since the temperature approaches in each of the columns can be within 1 to 10° F., an extremely efficient heat transfer is obtained. The chilled coolant is removed from the top of column 9 through line 10 and contacted with a conventional external heat exchange means 8 wherein makeup refrigeration is added to reduce the temperature of the coolant to the desired inlet temperature. Heat exchange means 8 provides the makeup refrigeration loss due to the heat of crystallization of the material being crystallized and refrigeration loss to the walls of the heat exchange towers and associate apparatus. Alternatively, the coolant can contain a volatile refrigerant and makeup refrigeration can be provided by allowing some of this material to vaporize external to the tower, thus cooling the coolant. The mother liquor, free of 5 to 95% of crystallizable water, and after heat exchange with the coolant, is withdrawn from tower 9 through line 12.

It is to be understood that more than one treating tower and one heat exchange tower may be used in series or in parallel and that all of part of the crystallizable water present in an aqueous solution can be removed in one or more of treating towers. Where the towers are used in series, they can be operated at successively lower temperatures.

A detailed description of a scheme for the separation of potable water from salt water is described with reference to FIG. 2 of the drawings.

In tower 109, 10 to 30% by weight of the water present in the salt water is crystallized out of solution in the form of ice crystals which descend in the tower until they contact screen 112. The ice crystals collect in the bottom region of the tower on the screen, forming a crystal matrix which is washed by the incoming coolant. The ice crystals are separated from most of the mother liquor by screen 112 and diverted into line 110 and the mother liquor continues down and is removed from the bottom of column 109 through line 114 as the primary mother liquor at a temperature within 1 to 10° F. of the inlet temperature of the coolant.

In this embodiment five heat exchange towers are used, of which only one is used to crystallize water. Saline water at about ambient temperature is fed to tower 103 through line 101 and is countercurrently contacted with cool immiscible hydrocarbon oil coolant fed into tower 103 through line 105. The cool coolant is part of the coolant that was used to freeze the water in tower 109, and though now above the freezing temperature of the water, still is sufficiently cold to substantially reduce the temperature of the water feed prior to introducing the feed to crystallization tower 109. Either the coolant or the saline water can be sprayed as the dense dispersion in the heat exchange towers. The uniformity of the size of sprayed droplets is not as important where the towers are used merely as heat exchangers; however, more efficient heat transfer is realized and there is less tendency to form emulsions where the sprayed droplets are relatively densely packed and of uniform diameter.

The salt water feed, substantially reduced in temperature but above its freezing temperature, is withdrawn from the bottom of heat exchange tower 103 through line 104 and is fed into water crystallization tower 109 through spray head 108 in the form of a dense dispersion of uniform size diameter droplets which descend and are countercurrently contacted with a cold rising continuous hydrocarbon oil coolant phase introduced into tower 109 through line 111 and spray head 113. The coolant is introduced into the bottom of tower 109 at a temperature substantially below the freezing point of the saline water and leaves the top of tower 109 at a temperature within 1° to 10° F. of the incoming saline water feed.

The ice crystal slurry containing some occluded mother liquor as well as a minor amount of coolant (which has displaced mother liquor in the washing step) are withdrawn from the bottom region of tower 109 through take-off line 110 at a temperature intermediate the crystallization temperature and the inlet temperature of the coolant. A suitable pump device, not shown, can be utilized to facilitate the movement of the accumulated ice crystals from tower 109 through line 110 at centrifuge 115. The centrifuge separates the ice crystals and any occluded immiscible coolant from the secondary mother liquor. The secondary mother liquor leaves centrifuge 115 through line 116 and is combined with the primary mother liquor in line 114 by valve 132 into a single stream in line 118. The cold mother liquor is then heat exchanged with warm coolant from tower 103, fed to tower 119 through line 107, in dense dispersion tower 119 in a manner similar to that described with relation to tower 103, to recover refrigeration from the cold mother liquor and to cool the warm coolant.

The warm coolant, reduced in temperature by heat exchange in tower 119, is withdrawn through line 121 and a minor amount of refrigeration is added by make up refrigeration means 133. The cool coolant is then combined with a portion of the coolant in line 122 that was used to form the ice crystals in crystallization tower 109 and as a combined stream in line 134 are mixed with liquid isobutane by a mixing valve 135 and is fed to tower 123 which comprises the primary refrigeration means. In tower 123 the pressure is reduced and the liquid isobutane in the coolant is flashed thereby cooling the remaining coolant to the inlet temperature for crystallization tower 109, which temperature is substantially below the freezing temperature of the saline water solution being treated. The thus cooled coolant is withdrawn through line 111 and is ready for reuse in crystallization tower 109.

The vaporized isobutane refrigerant is taken overhead through line 125 and condensed by compressor 124. The compressed liquid isobutane is contacted in tower 126 with the separated ice crystals from centrifuge 115 introduced through line 117 into tower 126. The ice crystals are melted by the relatively warm isobutane, thereby cooling the liquid isobutane. In melting, any oil coolant occluded in the ice crystals is released and dissolves in the isobutane. The cold oil free water is removed from the bottom of tower 126 through line 129 and can be further heat exchanged with part of the warm coolant from heat exchange tower 103 introduced into tower 130 through line 136.

Warm potable water product is withdrawn from the bottom of tower 130 through line 131 at about ambient temperature. Slightly cooled coolant is withdrawn from the top of tower 130 through line 137 and can be combined with the slightly cooled coolant in line 121 and cycled to the flash vaporization tower 123.

The above described scheme represents a maximum conservation of refrigerant capacity, thereby minimizing the amount of refrigeration which must be added to the system. The major loss of refrigeration in this scheme will be to the equipment.

In any process wherein potable water is to be economically obtained from saline or sea water the conservation of refrigeration, efficient heat exchange, and purity of the water product are of the utmost importance. The above scheme is an embodiment which takes all of these features into consideration and provides potable water at a minimum cost. Obviously, variations such as using one or more crystallization towers in parallel or series is within the scope of the above description.

In the concentration of beverages and waste streams, for example, wherein there is considerably more leeway both as to cooling expense and purity of the removed water, such an efficient scheme will not be required. In such instances a simpler scheme more similar to that described in FIG. 1 can be utilized.

For purposes of simplification various pumps, pressure reduction valves, mixing valves, and auxiliary apparatus have been omitted from the drawings.

In another embodiment of this invention, beverages such as orange juice, lemon juice, grapefruit juice, vegetable juice, milk, sugar solutions, etc. are concentrated by the removal of about 65 to 85 percent of the water present in the beverage or solutions. The cold crystallization process is advantageous because it does not detrimentally affect the flavor and vitamin content of the juices treated and there is substantial economies affected in concentrating by freezing over that of concentrating by evaporation of water present. In the concentration of the juices by the removal of ice, a suitable initial cooling temperature of about 25 to 35° F. with a final cooling temperature of about 0 to 5° F. is utilized. The beverage being treated is introduced into the cooling tower or towers in the form of a dense dispersion at a temperature of 25 to 35° F. with an outlet temperature of 0 to 30° F. The coolant is conversely introduced at a temperature of −5 to +25° F. and leaves the tower at a temperature of about 20 to 30° F.

In a similar manner, beer is concentrated by the removal of water as ice crystals. Because of the alcoholic content of beer, the inlet temperature of about 20 to 30° F. which is slightly lower than that used for fruit juices, is used with a final temperature of about −10° to 0° F. The coolant, therefore, is introduced at a temperature of about −15 to +25 and is withdrawn at the inlet temperature of the beer at about 15 to 30° F.

In treating industrial waste streams which comprise dissolved solids to concentrate them prior to disposal, the waste stream is normally at the temperature at which it is removed from a particular process. For example, in concentrating waste sulfite liquors from a sulfite process of manufacturing paper, the liquors are normally obtained at a temperature of about 220° F. A sulfite waste liquor can be rapidly cooled by this dense dispersion technique as previously described from a temperature of about 220° F. to a temperature just above its freezing point of about 20 to 30° F. No ice crystals are formed in this step and the apparatus is used solely as an efficient heat exchange means. The sulfite liquor cooled to about 20 to 30° F. is subsequently fed to a second tower in accordance with the present invention in which tower 50 to 80 percent by volume of the water present is removed. The removed water in the form of ice crystals is relatively pure and can be disposed of in rivers or streams in a conventional manner. The concentrated mother liquor separated from the ice crystals can be further dried by evaporation and shipped and/or otherwise disposed of.

Further utilities of the above described process can be in the recovery of dissolved solids from aqueous streams by removing substantially all of the water in accordance with this invention. The liquid concentrate can be recovered, or in some cases a dried product can be obtained by removing the minor amount of water remaining by conventional evaporation processes. This process may be further used to purify dissolved solids by repeated crystallization of the water solvent from the dissolved solids.

This process has other obvious utilities in the pharmaceutical and chemical industries for dehydrating heat sensitive chemicals, medicines, vitamins, antibiotics and other pharmaceutical compounds.

This invention is further exemplified by the following examples:

*Example 1*

In an example of this invention, a typical saline water solution, containing 3.5 weight percent of sodium chloride as its principal contaminant, is countercurrently contacted with a $C_{11}$ to $C_{14}$ middle distillate hydrocarbon coolant, wherein the saline water solution is introduced as a dense dispersion of uniform diameter droplets in the top of the tower and is contacted with the continuous phase coolant introduced in the bottom of the tower. The saline water is fed at a temperature of about 68° F., and is rapidly cooled to a temperature of about 30° F. in a tower, as previously described, used solely as a heat exchange means. The cold saline water is then fed to a second tower at a temperature of about 30° F. in which it is countercurrently contacted in a similar manner with a coolant fed into the tower at a temperature of about 25 to −5° F. The ice crystals initially form in the top of the tower within the sprayed droplets and descend countercurrently, as they grow in size, to the ascending continuous coolant phase and are cooled with the coolant at a rate of 0.5 to 2 degrees per minute, facilitating the formation of ice crystals substantially free of occluded dissolved solids.

Cooling of the saline water below its freezing point and the growing of the crystals is controlled so that the crystals have sufficient time as they grow to reject otherwise occluded dissolved solids. The ice crystals are removed from the bottom of the column with the mother liquor and are found to have a size between 150 and 1000 microns. Very few if any small crystals are present.

The crystals and mother liquor slurry are charged to a basket centrifuge wherein the crystals are separated and continuously washed with recycled mother liquor to separate substantially pure ice crystals. The ice crystals are melted and found to contain less than about 300 to 500 parts per million of sodium chloride, which water is suitable for most potable uses. About 10 to 30% by volume of the feed is removed as fresh water, and the remaining mother liquor has a concentration of 4 to 6% by weight salts. The cold mother liquor and ice crystals are separately heat exchanged with the coolant to recover refrigeration. The mother liquor is then discarded.

*Example 2*

In another example of the invention, saline water is converted to potable water. Saline water is fed to the top of the dense dispersion column at a temperature of about 31° F. in the form of dense dispersion of uniform diameter droplets and is chilled to about 28° F. by countercurrent contact with an ascending continuous coolant phase of a middle distillate oil entering the bottom of the column at about 21.8° F. The coolant leaves the top of the column at a temperature of about 30° F. Chilling saline water droplets to about 28° F. crystallizes about 10% by weight of the saline water feed to relatively salt free ice crystals. The crystallized water and motor liquor can be transferred to a basket centrifuge wherein the ice crystals are separated from the motor liquor. There is no contamination of the crystals with the oil. The ice crystals are then melted to obtain desalinated or potable water containing less than 500 p.p.m. of NaCl.

*Example 3*

Figure 2:
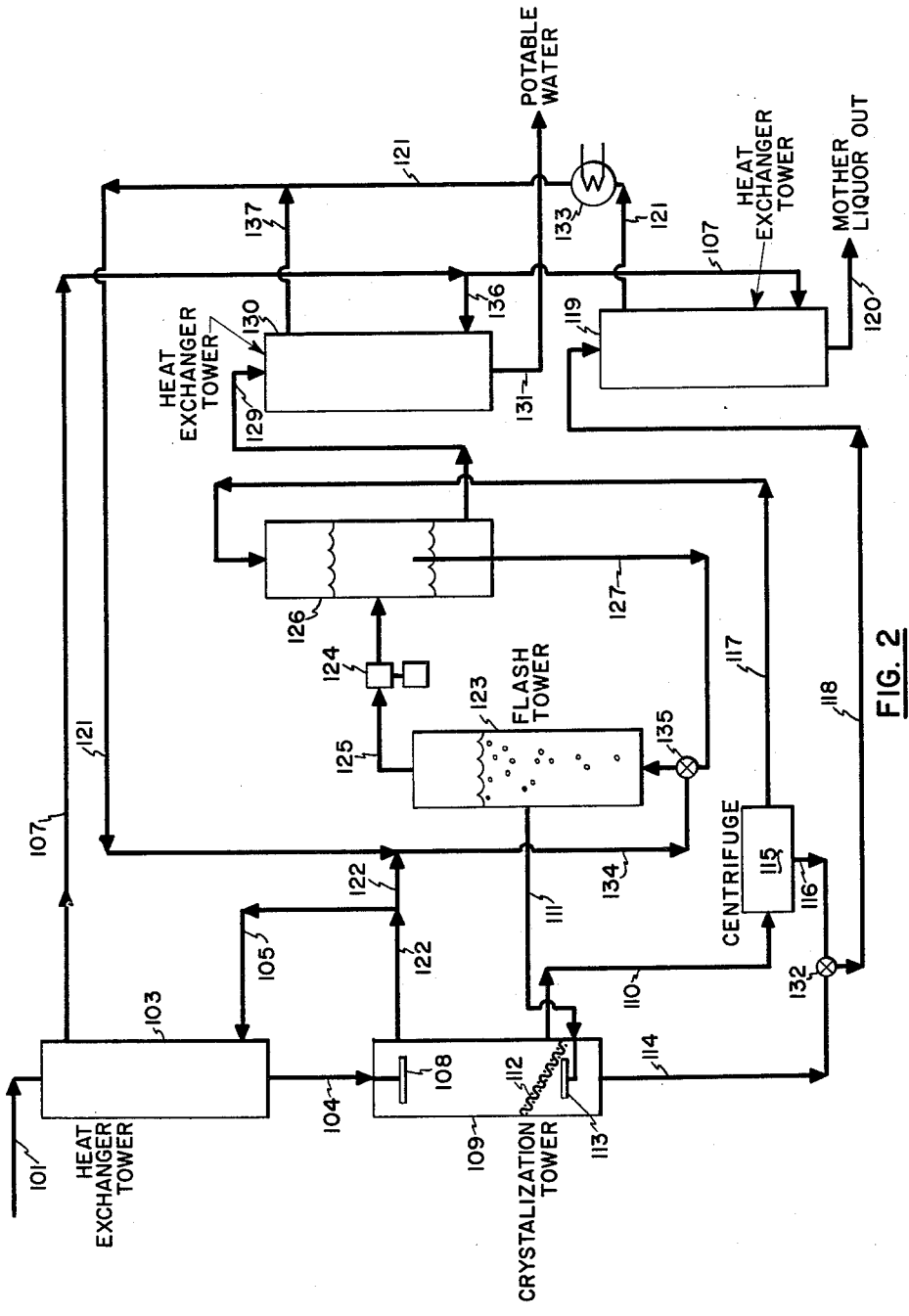
Figure 3:
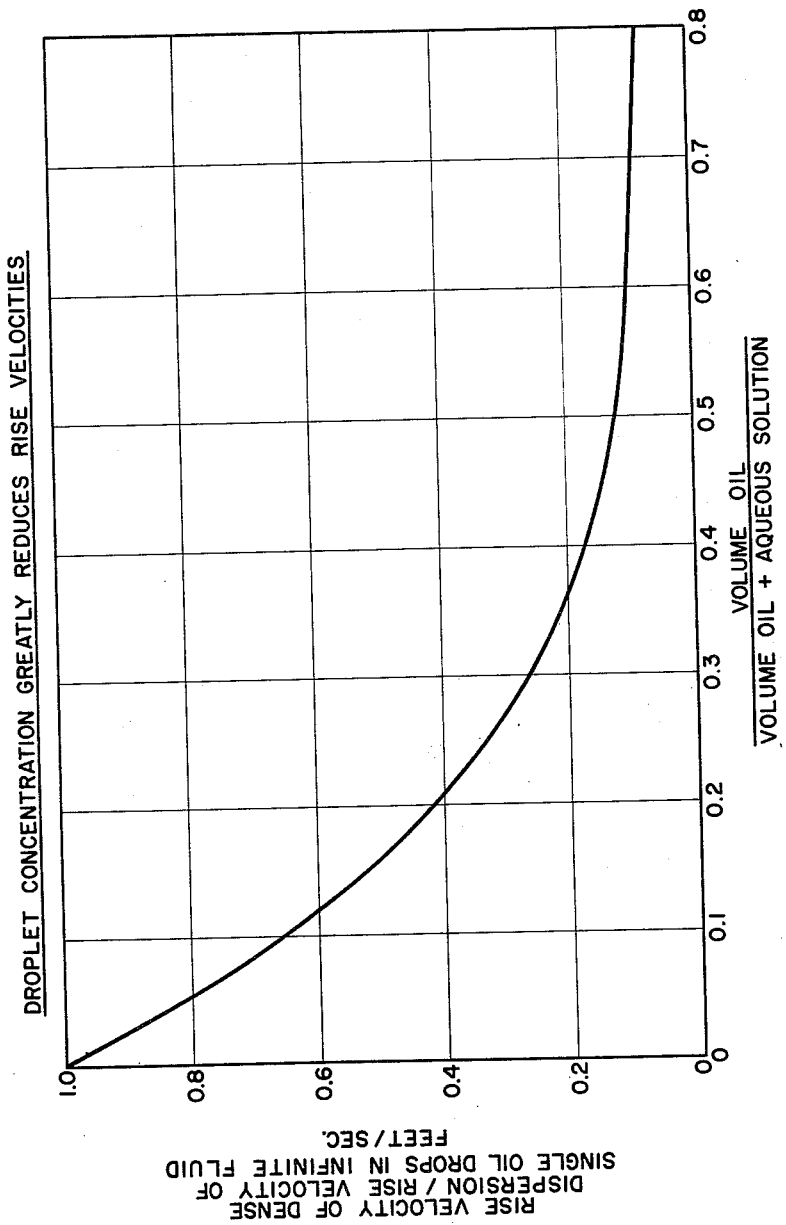

An aqueous sodium chloride solution having a freezing temperature of about 27 to 30° F. and containing about 4 percent by weight of sodium chloride as the principal contaminant, was sprayed in a treating column as described in FIGS. 1 or 2 of the drawings, in the form of a dense dispersion of uniform diameter water droplets of about ⅛ to ⅜ inch diameter. The inlet temperature of the feed was about 30° F. The spray area was protected from the standing continuous phase vortex by means of an annular baffle having a vertical height of about 2 inches. The spray head was about 3¼ inches in diameter and contained orifices of about ⅛ inch diameter. The feed was introduced through the orifices at a velocity of about .1 to .3 ft./sec. The immiscible coolant comprised a middle distillate hydrocarbon boiling in the range of 300 to 500° F. which was fed to the bottom of the tower at a temperature of about 0 to 20° F. The sprayed aqueous droplets form a dense dispersion and descend as a dense bed of uniform size droplets countercurrently to the ascending continuous coolant phase. The droplet holdup or volume density of the dispersed aqueous droplets will be 35 to 60% of the tower volume. This provided a chilling rate of about 4 to 8° F./minute. About 10 to 20% by volume of the water present in the aqueous solution crystallized within the sprayed droplets and forms ice crystals. The mother liquor was withdrawn at a temperature of about 26 to 28° F. The continuous immiscible cooling phase was withdrawn from the top of the tower at a temperature of about 25 to 28° F.

The ice crystal slurry can be further purified by being washed with coolant or with a small amount of pure water. The washed crystals can be separated from the coolant or any remaining mother liquor by conventional means.

The ice crystals obtained after centrifugation are melted and will comprise substantially pure water suitable for potable uses. These will contain less than 500 p.p.m. NaCl.

Where saline water is treated to obtain fresh water, and since there is a substantially inexhaustible supply of saline water, it may be more efficient to remove only from about 10 to 20% of the water present, since this can be done at reasonable temperatures, thus saving on low temperature refrigeration cost. Further, since most of the refrigeration spent on cooling the mother liquor and forming the ice is recovered in other towers makeup, refrigeration is kept at a minimum.

The application of this invention to feeds containing various dissolved solid materials and to colloidal suspensions with various immiscible coolants and with various solvents is readily apparent to one skilled in the art from the above description. The critical feature of this invention is in growing crystals within droplets of a dense dispersion of uniform size droplets which do not agglomerate or stick together and move at a controlled rate and which are chilled by countercurrently contacting with a continuous phase of coolant in such a manner that an efficient heat exchange between the droplets and coolant and uniform crystal growth of the crystallizable material within the droplets are obtained.

This invention is not to be limited by any theory of operation but only by the appended claims.

What is claimed is:

1. A method of obtaining relatively pure water from an aqueous solution comprising countercurrently contacting said aqueous solution with a continuous phase immiscible liquid coolant of different density than said solution, said coolant being introduced at a temperature substantially below the freezing point of the water feed, the feed being introduced at a temperature above its freezing point, in a tower by spraying said feed into the tower in the form of a dense dispersion made up of substantially uniform diameter droplets which move as a moving bed of spheres providing maximum contact and efficient heat transfer between the coolant and the droplets, wherein ice crystals are grown at a controlled rate within each of the sprayed droplets and withdrawing said coolant from said tower in the liquid phase.

2. The process of removing water in the form of ice crystals from a salt water solution having a freezing point between 27 and 30° F. containing about 4 weight percent of sodium chloride as the principal contaminant, comprising countercurrently contacting said feed at a temperature above its freezing point, with a continuous liquid phase immiscible coolant at a temperature below the freezing point of the feed, said coolant comprising a middle distillate hydrocarbon oil, by spraying said salt water solution into the top of a heat exchange tower in a form of a dense dispersion made up of substantially uniform diameter droplets of about ⅛ to ⅜ inch diameter which droplets descend as a moving bed of spheres and are cooled at a rate of about 2 to 4°/min., separating the ice crystals and mother liquor from the coolant and withdrawing said coolant from said tower in the liquid phase.

3. A method of obtaining decreased salt concentration an aqueous salt solution comprising countercurrently contacting said aqueous solution with a continuous phase liquid immiscible coolant, said coolant being introduced at a temperature substantially below the freezing point of the water feed, the feed being introduced at a temperature above its freezing point, in a tower by spraying said feed into one end of the tower in the form of a dense dispersion made up of uniform diameter droplets introducing the coolant into the other end of the tower, said droplets which move as a moving bed of spheres providing maximum contact and efficient heat transfer between the coolant and the droplets withdrawing said coolant from said tower in the liquid phase, wherein ice crystals are grown at a controlled rate within each of the sprayed droplets, said ice crystals being accumulated in the bottom region of the tower in the form of a crystal matrix which matrix is countercurrently contacted with and washed by the incoming coolant, wherein the coolant phase displaces at least a portion of the occluded mother liquor from the ice crystals.

4. A process for crystallizing water from an aqueous solution which comprises the introduction of an aqueous solution containing the said water to be crystallized into one end of a vertical treating zone in the form of a dense dispersion of substantially uniform droplets, introducing at the other end of said treating zone as a continuous phase an immiscible liquid coolant of a different density than said aqueous solution, said coolant being introduced at a temperature below the freezing point of the said water in the said aqueous solution, countercurrently contacting the said coolant and the said solution and removing continuously at one end of the said zone the said coolant in the liquid phase and at the other end of said zone ice crystals and concentrated solution.

5. A process of growing ice crystals and thereby removing water from an aqueous solution comprising cooling the said solution to a temperature just above the temperature at which ice begins to crystallize at the concentration of dissolved solids within the said solution, spraying the said solution as a dense dispersion of substantially uniform diameter droplets into a tower, contacting the said droplets within the said tower countercurrently with a continuous phase liquid immiscible coolant, said coolant being introduced at the opposite end of the tower at a temperature sufficiently below the crystallizing temperature of the said aqueous solution to precipitate the desired amount of crystals from the said solution, withdrawing said coolant from said tower in the liquid phase and withdrawing ice crystals and mother liquor and separating the precipitated crystals from the mother liquor, melting the crystals and recovering water.

6. The process of claim 5 wherein the inlet temperature of the coolant is up to 1 to 10° below the temperature of the solution after said solution has been countercurrently contacted with the said coolant.

7. A method of obtaining water of decreased salt concentration from an aqueous salt solution comprising countercurrently contacting said aqueous solution with a continuous phase liquid immiscible coolant, said coolant being introduced at a temperature substantially below the freezing point of the aqueous feed, the feed being introduced at a temperature above its freezing point in a tower by spraying said feed into one end of the tower in the form of a dense dispersion made up of essentially uniform diameter droplets, which droplets move as a moving bed of spheres countercurrently to the continuous phase immiscible coolant of different density than said feed, said feed being introduced into the opposite end of the tower than said coolant, providing maximum contact and efficient heat transfer between the coolant and the droplets, chilling the spray droplets at a rate of 0.25 to 15° F. per minute, wherein ice crystals are formed at a controlled rate within each of the droplets, maintaining temperature difference between the coolant and the spray droplets throughout the tower of up to 1 to 10° F., withdrawing said coolant from said tower in the liquid phase, removing the ice crystals and mother liquor from the bottom of the tower, separating the ice crystals from the mother liquor, melting the ice crystals to recover water of reduced salt content.

8. The process of claim 7 wherein the inlet feed temperature is 20 to 200° F. and the inlet coolant temperature is below the crystallization temperature of the water in the feed and is 30 to −100° F.

9. The process of claim 7 wherein the inlet temperature is above the crystallization temperature of the water in the feed and is 25 to 70° F., and the inlet coolant temperature is below the crystallization temperature of the feed and is 20 to −30° F.

10. The process of claim 7 wherein the cooling rate of the aqueous feed solution is controlled in such a manner by controlling the volume density between 0.35 to 0.80 cubic foot of feed droplets per cubic foot of tower so that the ice crystals are allowed to grow sufficiently slowly to allow them to reject occluded dissolved solids.

11. A method of obtaining water of decreased salt content from an aqueous salt solution comprising countercurrently contacting said aqueous solution with a continuous phase liquid immiscible coolant, said coolant being introduced at a temperature below the freezing temperature of the feed, the feed being introduced at a temperature above its freezing point, introducing the feed into one end of the tower by spraying said feed in the form of a dense dispersion made up of essentially uniform diameter droplets wherein the volume density of the droplets in the tower is 0.35 to 0.80 of the volume of the tower, which droplets move as a bed of spheres countercurrently to the continuous coolant phase introduced into the opposite end of the tower, said coolant being of different density than said feed, said droplets being introduced of a substantially uniform size of ⅜ to ½₄ inch in diameter, wherein efficient heat transfer between the coolants and droplets takes place, chilling the spray droplets at the rate of 0.25 to 15° F. per minute, maintaining a temperature difference between the coolant and spray droplets of up to 1 to 10° F., wherein ice crystals are gradually grown at a controlled rate within each of the spray droplets, removing the dispersed phase feed droplets at the end of the tower from which the continuous coolant phase is introduced and removing the continuous coolant phase as a liquid from the end of the tower from which the dispersed phase feed droplets are introduced, removing ice crystals and mother liquor from the tower, separating the ice crystals from the mother liquor, melting the crystals to recover water of reduced salt content.

12. A process for obtaining water of reduced salt content by crystallizing water from an aqueous solution which comprises the introduction of an aqueous solution containing said water to be crystallized to one end of a vertical treating zone in the form of a dense dispersion of substantially uniform diameter droplets, introducing at the other end of said treating tower as a continuous phase an immiscible liquid coolant of different density than said aqueous solution, said coolant being introduced at a temperature below the freezing point of said water in said aqueous solution, said coolant being warmest at the time of initial contact with the feed, countercurrently contacting said coolant and said solution and removing continuously at one end of the tower coolant in the liquid phase, said coolant being coldest at the point of initial introduction into the tower and being the warmest at the point of removal from the tower after contact with the dispersed phase feed, recovering ice crystals and mother liquor, separating the ice crystals from the mother liquor to recover water of reduced salt concentration.

References Cited by the Examiner
UNITED STATES PATENTS

| | | | |
|---|---|---|---|
| 2,666,304 | 1/54 | Ahrel | 62—58 |
| 2,764,488 | 9/56 | Slattery. | |
| 2,886,603 | 5/59 | Shelton | 62—124 X |
| 2,997,856 | 8/61 | Pike. | |
| 3,093,975 | 6/63 | Zarchin | 62—58 |
| 3,098,733 | 7/63 | Rosenstein | 62—58 |

FOREIGN PATENTS

| | | |
|---|---|---|
| 841,374 | 7/60 | Great Britain. |
| 70,507 | 6/46 | Norway. |
| 102,539 | 9/41 | Sweden. |

NORMAN YUDKOFF, *Primary Examiner.*
ROBERT O'LEARY, GEORGE D. MITCHELL,
*Examiners.*